June 11, 1968     R. GOTTSCHALD ETAL     3,387,870
ELASTIC BELLOWS PACKINGS FOR UNIVERSALLY MOVABLE JOINTS
AND MORE PARTICULARLY FOR BALL JOINTS
Filed Nov. 15, 1966

Inventors
Rudolf Gottschald
Jakob Vogt

Arthur Schwartz
ATTORNEY

United States Patent Office 3,387,870
Patented June 11, 1968

3,387,870
ELASTIC BELLOWS PACKINGS FOR UNIVERSALLY MOVABLE JOINTS AND MORE PARTICULARLY FOR BALL JOINTS
Rudolf Gottschald, Osterath, and Jakob Vogt, Osterath-Bovert, Germany, assignors to Messrs. A. Ehrenreich & Cie., Dusseldorf-Oberkassel, Germany
Filed Nov. 15, 1966, Ser. No. 594,618
Claims priority, application Germany, Nov. 20, 1965, E 30,498
7 Claims. (Cl. 287—87)

ABSTRACT OF THE DISCLOSURE

An elastic bellows sealing device for universal ball joints including a housing with a joint pin extending outwardly therefrom, the bellows connected to the housing opening and joint pin. A ring-shaped member cooperating with a portion of the bellows to secure the bellows to the joint pin and still maintain the proper movements.

---

The present invention relates to an elastic bellows packing for universally movable joints and more particularly for ball joints used with guides and steering gear, wheel suspensions, etc. in motor vehicles in which one rim is fixed to the joint case while the other rim of the passage opening for the joint pin is tightly surrounding said joint pin.

Among other disadvantages in ball joints of the above type that, upon angular deflection of the joint, the opening of the bellows packing for the passage of the joint pin is subject to distortion which results in deviation of the passage opening from its circular surrounding shape detrimentally affecting the desired sealing at the joint pin. At least it is detrimental to sealing of the opening on those areas which are not facing the deflecting area, since the bellows is not following angular deflection but is distorted by the same. If the socket of the joint pin is strongly fixed by means of a rigid loop with a tightening effect, required rotation of the joint pin in the socket is impeded.

It is already known to provide the opening where the joint pin passes through the bellows with an enclosure of its rim facing the joint pin or the interior surface consisting of metal discs which are engaged to the joint pin by an interference fit and which surround the rim of the opening from the inside, said rim being movable between the metal discs and consequently being expandable upon angular deflection. In this connection another type may also be possible in which the rim of the opening is inserted, under corresponding angular adjustment, into an exterior groove of a metal ring which is connected to the joint pin by an interference fit in which case the rim must be able to glide in the groove channel. As soon as the latter is the case, the connection with the ring is not sufficiently tight as to ensure a sealing effect or stability.

Still another bellows packing provides for a radial splitting of the rim of the bellows opening surrounding the joint pin in which case, on the side not facing the joint case, the ring flange of a disc ring is inserted with respect to the rim part located at that point, the ring flange of said disc ring leaving a gap with respect to the joint pin while the exterior rim of said ring is overlapping the bead of the bellows comprising the opening after angular adjustment. The other part of the rim is contacting the joint pin and is, on the side facing the joint case, covered by a ring disc which is in contact with a shoulder at the joint pin on the other side. This manner of connecting the bellows to the joint pin is rather expensive. The sealing area of the bellows at the joint pin is comparatively small and is liable to result in imperfect sealing.

The main object of the present invention is to provide, in a simple manner, a packing of the bellows at the joint pin which, while ensuring a sufficiently great sealing area at the joint pin, will exclude detrimental effects due to angular deflection of the joint pin, enable turning of the joint pin and not require any special expensive measures for this end.

Primarily, this object has been achieved in that the socket of the packing bellows forming the passage opening of the joint pin or the projecting hub collar corresponding to the foregoing is surounded by the rim edge of a ring disc, preferably made from a polyamide, while the socket is contacting the disc with the face of its rim not facing the joint case.

By this arangement the elastic packing bellows or its socket is directly contacting the joint pin with a comparatively large area while the joint pin is able to turn within the socket, and that angular deflections are not likely to result in a distortion of the socket detrimentally affecting engagement and thus the sealing effect. The joint pin will also be able to turn within the ring disc. If the ring disc is made from a polyamide, this will moreover result in a good gliding surface with respect to the lever eye to be attached to the joint pin. The gliding surface is especially resistant to abrasion.

Summary

The socket may be provided with an elastic tension ring, preferably made from polyurethane based plastic, which is placed into the outside of the socket and which is overlapped by the edge.

The elastic tension ring adds to the sealing contact of the socket at the joint pin without resulting in a squeezed zone and inadmissibly reducing turning of the joint pin.

In another embodiment according to the invention the rim of the edge facing the joint case engages a circumferential groove of the socket by means of angular adjustment directed towards the joint pin.

In this example the bellows which are provided with an annular flange disc form a uniform part which is pushed onto the joint pin.

For the same purpose the socket and the edge may preferably engage in the form of dove-tails with the surfaces facing each other.

Brief description of the drawing

The drawing shows various examples of construction according to the present invention.

Detailed description of the drawing

Figure 1:
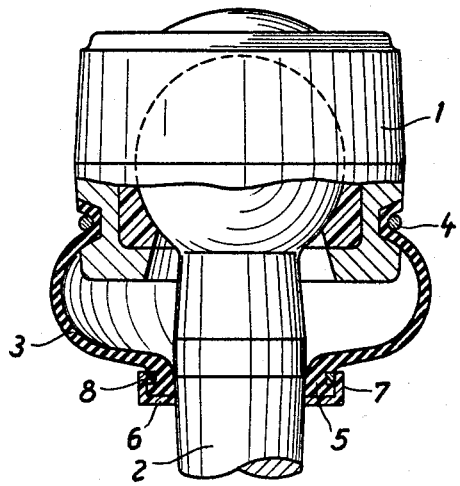
FIG. 1 is an elevational view of a ball joint together with a section of the bellows part contacting the joint pin.

In a manner already known the joint pin 2 is supported in the joint case 1 via a ball head so that the joint pin will be universally movable. Packing of the joint pin leaving the joint case is effected by means of elastic bellows 3.

The bellows 3 are, for instance, fixed to the joint case 1 by means of a spring ring or a wire loop 4.

The passage opening of the bellows for the joint pin 2 is formed by the socket 5 which is in close contact to the joint pin, but which however enables the joint pin to turn in the socket. The annular disc 6, made from polyamide plastic, is located on the joint pin. The annular disc has an edge 7 by means of which said disc surrounds the socket. The joint pin 2 is able to turn with respect to the disc 6. The face of the socket is contacting the disc.

In FIG. 1 the socket is provided with an exterior tension ring consisting of polyurethane plastic which has been placed in said socket. Prior to insertion the diameter of the tension ring is smaller than after its insertion.

Figure 2:
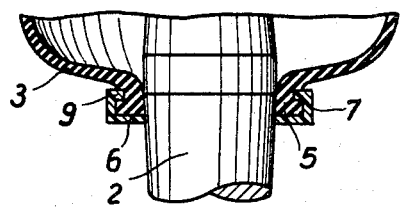
FIG. 2 is a vertical section of a connection between annular flange disc and bellows packing.

In the embodiment according to FIG. 2 the rim 9 of the edge 7 has been angularly adjusted towards the inside and is engaging a circumferential groove of the socket.

Figure 3:
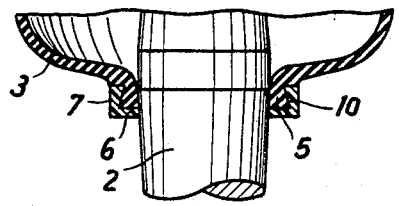
FIG. 3 is another embodiment of the connection shown in FIG. 2.

FIG. 3 shows an example of a construction according to the present invention in which the socket and the edge are in the form of dove-tails with their surfaces 10 facing each other.

We claim:
1. An elastic bellows sealing device for universal ball joints comprising:
   (a) a joint housing having an opening in at least one end,
   (b) a joint pin extending outwardly therefrom,
   (c) a sealing bellows having a pair of openings, one at either end thereof,
   (d) one of said openings having an edge attached adjacent the edge of said housing opening,
   (e) the other of said openings having an edge secured to said joint pin,
   (f) said bellows having a short axially extending portion at the end secured about said joint pin and extending about said joint pin,
   (g) a ring-shaped member having a radially extending portion about said joint pin and having an axially extending portion about said axially extending bellows portion,
   (h) an elastomeric tensioning ring expanded about said axially extending bellows portion between said axially extending bellows portion and said axially extending portion on said ring-shaped member so as to secure said axially extending portion about said pin while allowing rotation of said pin within said ring-shaped member.
2. A device as defined in claim 1 wherein said tensioning ring is a polyurethane plastic.
3. A device as defined in claim 1 wherein said ring-shaped member is polyamide plastic.
4. An elastic bellows sealing device for universal ball joints comprising:
   (a) a joint housing having an opening in at least one end,
   (b) a joint pin extending outwardly therefrom,
   (c) a sealing bellows having a pair of openings, one at either end thereof,
   (d) one of said openings having an edge attached adjacent the edge of said housing opening,
   (e) the other of said openings having an edge secured to said joint pin,
   (f) said bellows having a short axially extending portion at the end secured about said joint pin and extending about said joint pin and further having a substantially annular groove on its periphery,
   (g) a ring-shaped member having a radially extending portion about said joint pin and having an axially extending portion about said axially extending bellows portion,
   (h) said axially extending portion on said ring-shaped member having a radial inwardly projecting flange extending within said groove on said axially extending bellows portion to provide a sealing engagement between said bellows and said joint pin, so as to secure said axially extending portion about said pin while allowing rotation of said pin within said ring-shaped member.
5. A device as defined in claim 4 wherein said ring-shaped member is polyamide plastic.
6. An elastic bellows sealing device for universal ball joints comprising:
   (a) a joint housing having an opening in at least one end,
   (b) a joint pin extending outwardly therefrom,
   (c) a sealing bellows having a pair of openings, one at either end thereof,
   (d) one of said openings having an edge attached adjacent the edge of said housing opening,
   (e) the other of said openings having an edge secured to said joint pin,
   (f) said bellows having a short axially extending dovetailed-shaped portion at the end secured about said joint pin and extending about said joint pin,
   (g) a ring-shaped member substantially L-shaped in section and including a radially extending portion about said joint pin and having an axially extending dovetailed-shaped portion about said axially extending dovetail-shaped bellows portion in interlocking relation therewith, so as to secure said axially extending portion about said pin while allowing rotation of said pin within said ring-shaped member.
7. A device as defined in claim 6 wherein said ring-shaped member is polyamide plastic.

References Cited

UNITED STATES PATENTS

| 2,305,265 | 12/1942 | Le Tourneau. |
| 2,496,839 | 2/1950 | Abramoska. |
| 2,617,279 | 11/1952 | Miller _____ 287—87 XR |
| 3,155,407 | 11/1964 | Gottschald _____ 287—87 |
| 3,166,943 | 1/1965 | Simmen _____ 74—18 |
| 3,227,478 | 1/1966 | Gottschald _____ 287—87 |
| 3,291,511 | 12/1966 | Langen _____ 287—87 |
| 3,292,957 | 12/1966 | Ulderup. |

FOREIGN PATENTS 556,965  10/1943  Great Britain.

EDWARD C. ALLEN, *Primary Examiner.*

CARL W. TOMLIN, *Examiner.*

ANDREW V. KUNDRAT, *Assistant Examiner.*